May 24, 1938.  L. H. LOEFFEL ET AL  2,118,092
DEVICE FOR POSTURE STUDY
Filed July 25, 1936   2 Sheets-Sheet 1

May 24, 1938.  L. H. LOEFFEL ET AL  2,118,092
DEVICE FOR POSTURE STUDY
Filed July 25, 1936   2 Sheets-Sheet 2

Inventors
Lester H. Loeffel
and Irving R. Versoy
By Rockwell Bartholow
Attorneys Patented May 24, 1938

2,118,092

UNITED STATES PATENT OFFICE 2,118,092

DEVICE FOR POSTURE STUDY

Lester H. Loeffel and Irving R. Versoy, New Haven, Conn., assignors to The Berger Brothers Company, New Haven, Conn., a corporation of Connecticut Application July 25, 1936, Serial No. 92,588

7 Claims. (Cl. 35—28)

This invention relates to jointed figures, and more particularly to a two-dimensional figure having parts of the form and shape of the human body in profile, which parts are pivotally or flexibly joined together at points approximating joints of the human body.

The correct erect posture of the human body is well recognized, as are also certain well-known types of incorrect posture, and incorrect postures, particularly with respect to that part of the body around the abdominal region, may be corrected, or at least greatly benefited, by the application of pressure to the proper part of the body, which may be effected by a properly designed corset or belt.

It is, therefore, of great advantage to corsetieres and fitters of these garments to know the position of the various parts of the body in the correct and incorrect postures, and to understand the principles of correction of incorrect postures by discerning at what points pressure should be applied to the body to correct a given error or deformity.

One object of the present invention is the provision of a jointed figure simulating the form of the human body in profile, the parts of which are flexibly joined together at points approximating joints of the human body.

A still further object of the invention is the provision of a jointed figure simulating the form of the human body in profile, and having represented on the parts thereof various internal organs of the body, the parts being flexibly joined together in such a manner that they may be placed in various recognized positions of incorrect posture and illustrate the displacement of the internal organs represented on the parts of the figure.

A still further object of the invention is the provision of a jointed figure having parts simulating the form of the human body in profile, which parts are flexibly joined together at points approximating natural joints of the human body, so that the figure may, by moving the parts about such joints in relation to each other, be placed in various recognized postures, the joints about which such movement takes place being substantially at joints of the human body, so that the movement of the parts faithfully portrays the bending of various parts of the body at such joints.

A still further object of the invention is the provision of a jointed figure which may be placed under elastic tension and the parts thereof moved in and out of a correct posture position by pressure on various parts of the jointed figure to illustrate the correction of incorrect posture by application of the proper corset or girdle.

To these and other ends the invention consists of the novel features and combinations of parts to be hereinafter described and claimed.

Figure 1:
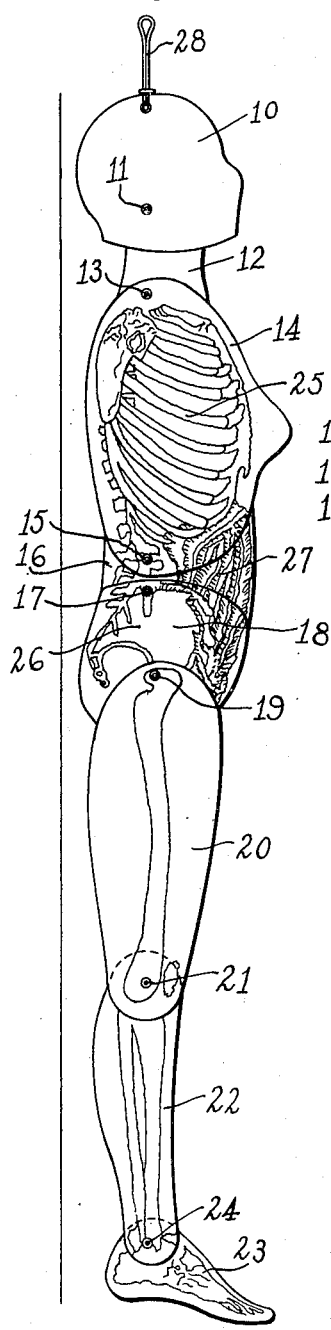
Fig. 1 is a front elevational view of a two-dimensional jointed figure embodying our invention, the figure being shown in erect posture.
Figure 2:
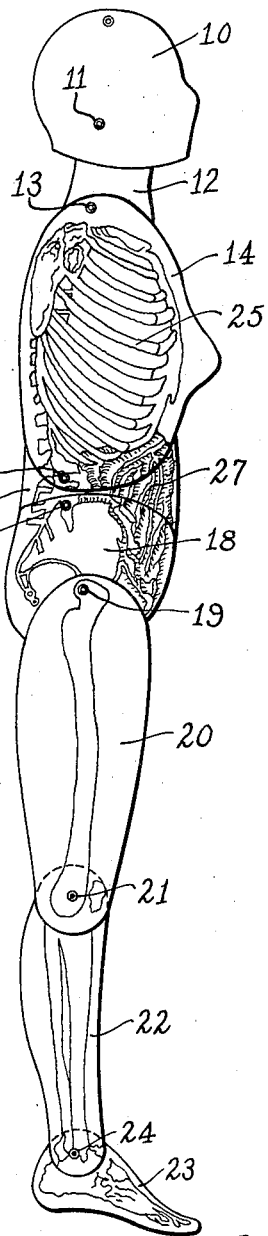
Fig. 2 is a view similar to Fig. 1 but showing the parts in what is commonly known as "fatigue" posture.
Figure 3:
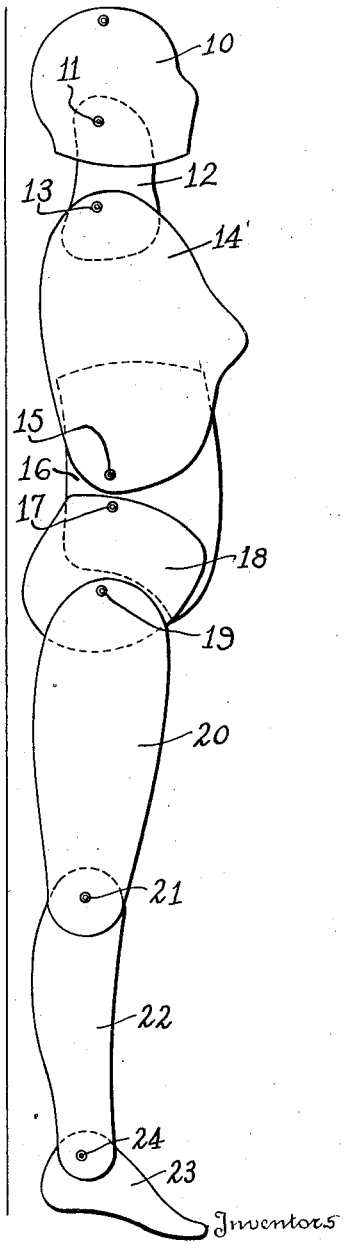
Fig. 3 is a view similar to Figs. 1 and 2, but showing the parts in "lordosis" posture, and in this figure certain details have been omitted for the sake of clearness.

To illustrate a preferred embodiment of our invention, we have shown in Figs. 1 to 3 of the drawings a two-dimensional figure simulating the outline of the human body in profile. As will be seen, this outline is the exterior outline of the body, including the fleshy portions thereof. As stated, the figure is two-dimensional, that is, it is composed of flat or plane sections which may be of any acceptable material, such as a relatively stiff cardboard, for example. The figure comprises a head portion 10 having pivoted thereto at 11 a neck portion 12 to which in turn is pivoted at 13 the chest or thorax portion 14. The latter extends downwardly nearly to the pelvic region, and at a point 15 adjacent its lower end is pivoted to an abdominal portion or section 16, the latter being in turn pivoted at 17 to a portion 18 which represents the hip and pelvic region of the body.

Adjacent the lower edge of the portion 18 is pivoted at 19 the upper leg section 20, in turn pivoted adjacent its lower end at 21 to the lower leg section 22, which carries the foot section 23 pivoted to the lower leg section at 24.

It will be observed that the pivots 19, 21 and 24 are disposed at the approximate position of the hip, knee and ankle joints in the human body. As the figure shown is flat or two-dimensional, the pivotal movement between the parts is in one plane only, corresponding to the forward or backward bending movements of the parts of the body. It will be noted that the pivots 15 and 17 are disposed above and below respectively the central portion of the abdominal region of the body. These pivotal points permit movements of the upper portion of the body corresponding to those permitted by the articulated spinal column. While there are, of course, many more joints in the spinal column than are provided by the pivots 15 and 17, we have found that placing these joints at the positions indicated will will, particularly as concerns the use for which our figure is adapted, permit in sufficiently accurate manner the illustration of various body postures.

Upon the chest or thorax section 14 may be represented the ribs and other portions of the skeleton, as shown at 25, and likewise the pelvic bones may be shown upon the portion 18, as at 26. Also, the intestines and other internal organs may be represented on the portions 14, 16 and 18, as shown at 27. If desired, the leg and foot bones may be shown on the portions 20, 22 and 23, and this, if found desirable, may be carried throughout the length of the figure so as to show the entire skeleton in side view. Thus the figure, when the parts are moved to show various body postures, will not only show the position of the exterior outline of the body, that is, the appearance of the flesh-covered body, but also show the position of the various parts of the skeleton in these postures. It will also be noted that the portion 16 lies behind the portions 14 and 18. This may be seen more clearly from Fig. 3, wherein the representation of the internal organs and bone structure of the body has been omitted to show more clearly the shape of the various parts of the figure. It may here be noted that these parts are so shaped that regardless of the position in which they are placed, they will in a fairly accurate manner illustrate the lines of the human body in profile. That is, regardless of the positions in which the parts are placed, the exterior lines thereof will merge to form an outline substantially like that of the human body.

In Fig. 1 of the drawings the parts of the figure are shown in the correct erect posture, which is, of course, that which is desired to be attained. In Fig. 2 of the drawings the figure is shown in that posture generally recognized as fatigue posture. It will be noted that the head is slightly forward, and the rib basket or chest portion 14 has moved slightly forward about the pivot 15. Likewise the pelvic portion 18 has moved slightly forward about the pivot 17. As the chest and pelvic portions are in front of the abdominal portion 16, it will be noted that less of this abdominal portion is exposed at the front of the figure. This very clearly appears when the representation of the intestines is printed upon the parts of the figure, and clearly shows that in the fatigue position the intestines and other internal organs are compressed or pressed together to occupy a smaller than normal space, as it will be noted that the area 27 is greater in Fig. 1 than in Fig. 2.

In Fig. 3 of the drawings the posture known as the lordosis posture is illustrated. In this view it will be seen that, the initial position of the figure having been substantially erect, the abdominal portion has been moved forwardly, resulting in an exaggerated curved back line and an exaggerated projection of the hips. This also exposes between the chest and pelvic sections a larger portion of the intestinal area than is exposed in Fig. 1, thus showing a condition opposite to that of the compressed condition shown in Fig. 2.

The figure illustrated may be advantageously employed to illustrate the positions upon the body at which pressure should be applied to correct the recognized types of incorrect posture. For example, the figure may be secured upon a vertical surface at the pivot point 24, and secured to said surface at its upper end by an elastic cord 28. When the elastic cord 28 is under slight tension, the parts of the figure will be drawn into the erect posture shown in Fig. 1, the various joints of the figure being so disposed that this result will be effected. If when in this position pressure is placed upon the front of the abdominal region of the body, this region will be moved rearwardly, thus drawing forwardly the chest and pelvic regions, resulting in the fatigue posture shown in Fig. 2. This condition may be corrected by applying pressure at the back of the pelvic and chest regions, and the user of the figure may determine by placing his fingers upon the rear edges of the chest and pelvic sections the points at which pressure should be applied to bring about the correct posture. It will be understood that during this operation the figure will be pivotally secured at the point 24 and the elastic cord 28 be under slight tension.

Likewise, the lordosis posture shown in Fig. 3 may be produced by pressure at the back of the abdominal section, and may be corrected by pressure applied at the front of this section.

Figure 4:
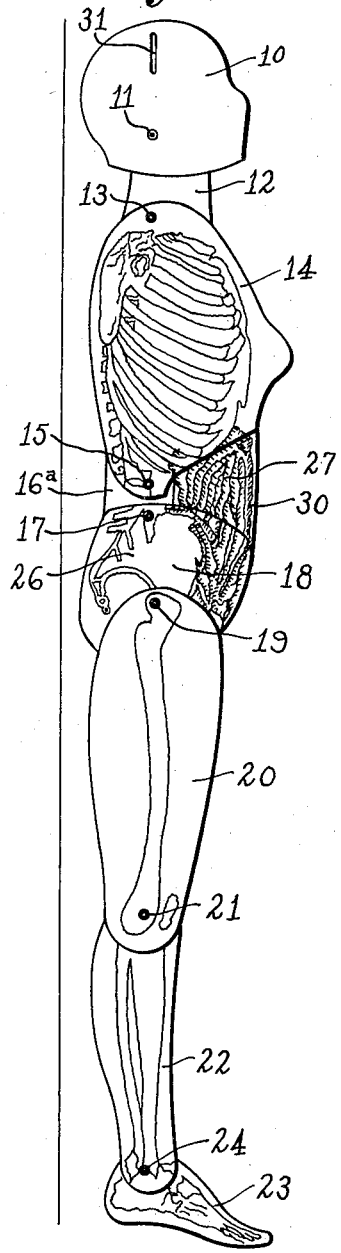
Fig. 4 is a front elevational view of a two-dimensional jointed figure of somewhat modified form, the figure being shown in erect position.
Figure 5:
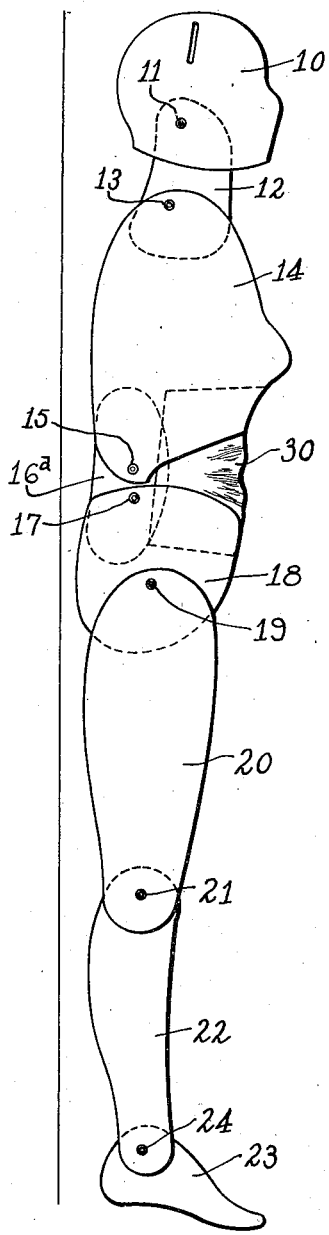
Figure 5 is a view similar to Fig. 4, but showing the parts in fatigue position and omitting certain details for the sake of clearness.

In Figs. 4 and 5 of the drawings we have shown a jointed figure of somewhat modified form. The head, neck, chest, pelvic and leg sections are substantially like those shown in Figs. 1 to 3, and are pivotally secured together in substantially the same manner. The difference between the figures shown in Figs. 4 and 5 and that shown in Figs. 1 to 3 lies in the abdominal section or portion of the figure. It will be seen that the abdominal section 16ᵃ, shown in Figs. 4 and 5, is considerably smaller than that shown in Figs. 1 to 3 in that it does not extend to the front of the figure, but merely acts as a link to join the chest portion 14 with the pelvic portion 18, and also to form the back line of the figure.

To form the front portion of the abdomen forwardly of the section 16ᵃ, we secure to the under faces of the chest portion 14 and pelvic portion 18, a piece of elastic fabric 30. This elastic fabric, as shown in Fig. 4, may have a representation of the intestines and other internal organs provided thereon. This elastic section 30 is so arranged that when the figure is in the erect position shown in Fig. 4 the elastic webbing comprising the section is flattened out but not placed under any appreciable tension, that is, it will be placed only under sufficient tension so that it will represent a flat surface. This will represent the correct position of the intestines. When, however, the parts are moved to the fatigue posture shown in Fig. 5, the elastic section will be collapsed or wrinkled to some extent and will give a very life-like appearance of the compressed condition of the intestines in a person assuming this posture. Likewise, when the lordosis position is assumed, the fabric 30 will be placed under tension and stretched to some extent, and thus accurately portray the position of the intestines in this posture. Various modifications of certain details of the structure will, of course, at once occur to those skilled in the art. For example, when the figure is supported upon a vertical surface, the head portion, instead of being held by the cord 28, may be provided with a vertical slot 31, as shown in Fig. 4, which vertical slot will receive a pin secured to the supporting surface. This will illustrate the lengthening and shortening of the body due to changes in posture in a manner similar to that when the figure is under the tension of the elastic cord 28. Also, the abdominal portion 16 may be made of a number of telescoping fan-shaped sections, the edges of which overlap and will slide by each other in nesting relation when changes in posture are produced.

It will be apparent that the jointed figure illustrated may be advantageously employed to demonstrate various body postures and changes of position in the bony structure of the body due to changes in posture, as well as the crowding of the abdominal organs resulting from incorrect posture, and these changes will be all the more effectively illustrated due to the fact that the various parts of the body are pivoted together at points approximating natural joints of the human body, and due to the fact that the bony structure of the body as well as the abdominal organs are represented upon the parts of the figure.

While we have shown and described some preferred embodiments of our invention, it will be understood that it is not to be limited to all of the details shown, but is capable of modification and variation within the spirit of the invention and within the scope of the appended claims.

What we claim is:

1. A device for posture study comprising a two-dimensional jointed figure having the profile contour of the human body, said figure including among other portions a flat plane chest portion, a flat plane pelvic portion lying in substantially the same plane as said chest portion, a flat plane member between and underlapping said first-named portions and to which said portions are directly pivoted in such relation that their adjacent edges are spaced from and diverge from each other, and means between said portions forwardly of said member representing the abdominal portion of the body, said chest and pelvic portions being movable on their pivots with respect to each other and to said last-named means to vary the exposed area of said means between said portions, whereby collapse and extension of the abdominal region of the body in fatigue and lordosis postures, respectively, may be represented.

2. A device for posture study comprising a jointed figure having a chest portion and a pelvic portion, a member interposed between said portions to which the latter are pivoted at spaced points, the outlines of the chest and pelvic portions being divergent at the forward portion of the body, an elastic fabric joined to the diverging edges of said chest and pelvic portions and representing by the area exposed between said portions the abdominal region of the body, whereby, when said portions are moved pivotally, the elastic fabric may contract and stretch to illustrate the collapse and extension of the abdominal organs of the body in different postures.

3. A device for posture study comprising a two-dimensional jointed figure having the profile contour of the human body, said figure including among other portions a flat plane chest portion having a curved lower end, a flat plane pelvic portion having a curved upper end, said portions having their ends spaced from each other, a member between and underlapping said portions, means for pivoting said portions to said member adjacent respectively the lower edge of the chest portion and the upper edge of the pelvic portion, said chest portion and pelvic portion having diverging edges respectively in front of and at the rear of said pivoting means, and means between the forwardly diverging edges of said portions representing the abdominal portion of the body, said chest and pelvic portions being movable on their pivots with respect to each other and to said last-named means to vary the exposed area of said means between said portions, whereby collapse and extension of the abdominal region of the body in fatigue and lordosis postures, respectively, may be represented.

4. A device for posture study comprising a two-dimensional jointed figure having the profile contour of the human body, said figure including among other portions a flat plane chest portion, a flat plane pelvic portion spaced from said chest portion and in the same plane, a member between said portions and in a rearward plane to which both of them are directly pivoted by pivots respectively adjacent the lower edge of the chest portion and the upper edge of the pelvic portion, said member being provided adjacent the front of the figure with a representation of the abdominal organs, said chest and pelvic portions being pivotally movable relatively to each other and to said member to vary the exposed area of the latter between said portions as the figure assumes different positions.

5. A device for posture study comprising a two-dimensional jointed figure having the profile contour of the human body, and including among other portions a flat plane chest portion, a flat plane pelvic portion in the same plane as said chest portion and spaced therefrom, a member between said portions to which both are pivoted directly, means between said portions forwardly of said member representing the abdominal region of the body, and means for placing said figure under longitudinal tension and thereby bringing the pivot points into substantial alinement in order to illustrate thereby the erect posture of the human figure.

6. A device for posture study and more particularly for study of the effects of fatigue and lordosis postures on the abdominal region, comprising a two-dimensional jointed figure having the profile contour of the human body, said figure including a flat plane chest portion, a flat plane pelvic portion spaced from said chest portion, a member between and underlying said portions and to which both are pivoted, the edges of said chest and pelvic portions in front of the pivots diverging forwardly, means between said portions representing the abdominal region of the body, and means for exerting tension on the figure in order to bring the figure to the erect position, said abdominal-region-representing means being further exposed when the figure is moved from the erect to the lordosis posture, and having its exposure decreased when the figure is moved from the erect posture to the fatigue posture.

7. A device for posture study comprising a two-dimensional jointed figure having the profile contour of the human body, said figure including flat plane head, neck, chest, abdominal, pelvic and leg portions, and means in association with the head portion for placing said figure under longitudinal tension in order to bring the pivot points into substantial alinement to illustrate thereby the erect posture of the human figure, said chest and pelvic portions being relatively movable with respect to each other and to the abdominal portion when the tension is removed in order that the figure may be placed in fatigue and lordosis postures, respectively, said abdominal portion being exposed between said chest and pelvic portions to a less degree in the former posture and to a greater degree in the latter posture.

LESTER H. LOEFFEL.
IRVING R. VERSOY.